(12) United States Patent  (10) Patent No.: US 7,710,712 B2
Takeoka  (45) Date of Patent: May 4, 2010

(54) MULTI-LAYER CERAMIC CAPACITOR

(75) Inventor: Shinsuke Takeoka, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 144 days.

(21) Appl. No.: 11/854,661

(22) Filed: Sep. 13, 2007

(65) Prior Publication Data

US 2008/0068777 A1   Mar. 20, 2008

(30) Foreign Application Priority Data

Sep. 15, 2006   (JP) .............................. 2006-281923

(51) Int. Cl.
*H01G 4/06*  (2006.01)

(52) U.S. Cl. .................................... 361/321.2

(58) Field of Classification Search ... 361/321.1–321.5, 361/311
See application file for complete search history.

(56) References Cited

U.S. PATENT DOCUMENTS

| | | | | |
|---|---|---|---|---|
| 5,600,533 | A * | 2/1997 | Sano et al. | 361/321.4 |
| 5,910,881 | A * | 6/1999 | Ueno | 361/313 |
| 6,900,977 | B2 * | 5/2005 | Nakamura et al. | 361/321.2 |
| 6,917,513 | B1 * | 7/2005 | Kim et al. | 361/321.2 |
| 2003/0203805 | A1 * | 10/2003 | Maher et al. | 501/137 |
| 2004/0105214 | A1 * | 6/2004 | Nakamura et al. | 361/321.2 |
| 2005/0260410 | A1 * | 11/2005 | Fujikawa et al. | 428/403 |
| 2006/0087796 | A1 * | 4/2006 | Yamazaki et al. | 361/321.2 |

FOREIGN PATENT DOCUMENTS

| | | |
|---|---|---|
| JP | 5-9066 | 1/1993 |
| JP | 05-217426 | 8/1993 |
| JP | 10-308321 | 11/1998 |

* cited by examiner

*Primary Examiner*—Eric Thomas
(74) *Attorney, Agent, or Firm*—Law Office of Katsuhiro Arai

(57) ABSTRACT

A multi-layer ceramic capacitor capable of being sintered at 1,080° C. or lower in a reducing atmosphere, having a permittivity of 2,000 or more, a temperature characteristic of X7R characteristic or X8R characteristic, and favorable life time property, in which the internal electrodes are formed of Cu or a Cu alloy, the dielectric ceramics are constituted with grains each of an average value for the diameter of 400 nm or less as viewed on the cross section and grain boundaries, the grain comprises a dielectric substance having a domain pattern and shells formed on the surface of the dielectric substance and with t/D from 2% to 10% where D represents an average value for the diameter of the grains as viewed on the cross section and t represents the average value for the thickness of the shells.

7 Claims, 2 Drawing Sheets

MULTI-LAYER CERAMIC CAPACITOR

BACKGROUND OF THE INVENTION

1. Field of the Invention

The present invention concerns a multi-layer ceramic capacitor in which an internal electrode is constituted with a base metal and it particularly relates to a multi-layer ceramic capacitor using Cu for the internal electrode.

2. Description of the Related Art

For multi-layer ceramic capacitors used for electronic equipments such as portable equipments and telecommunication equipments, a demand for reducing the size and increasing the capacitance has been increased more and more. Further, a demand has been increased also for the reliability, and a multi-layer ceramic capacitor with a flat temperature characteristic (TC) for permittivity and having a good high temperature acceleration life time property characteristics (hereinafter referred to as "life time property") has been demanded.

As means for obtaining the multi-layer ceramic capacitor of smaller size and large capacitance described above, JP-A No. 5-9066, for example, discloses a method of using a non-reduction dielectric substance porcelain composition. However, various additives are added in such a dielectric substance porcelain composition for providing anti-reducing property. Therefore, a baking temperature of 1,100° C. or higher was necessary for sintering the dielectric substance porcelain composition. Further, also for the internal electrode, a high melting Ni had to be used.

On the other hand, a multi-layer ceramic capacitor using a material capable of being baked at a low temperature of about 1,000° C. in view of the energy efficiency has been proposed. For example, JP-A No. 5-217426 discloses a non-reducing dielectric substance porcelain composition capable of being baked simultaneously with an inner electrode material such as Cu. However, since the dielectric substance porcelain composition described above has a low permittivity although the temperature characteristic is flat and it is difficult to obtain a small size and large capacitance multi-layer ceramic capacitor.

Further, for obtaining a multi-layer ceramic capacitor having a flat temperature characteristics and high permittivity ($\epsilon \geq 2,000$), JP-A No. 10-308321, for example, discloses a method of using a dielectric substance porcelain comprising sintered grains having a core-shell structure. It is necessary in the core-shell structure to diffuse additives such as Mg in the crystal grains. However, diffusion of the additives in the crystal grains requires a baking temperature of 1,100° C. or higher.

SUMMARY OF THE INVENTION

The invention is intended to provide, in an embodiment, a multi-layer ceramic capacitor capable of being sintered at 1,080° C. or lower in a reducing atmosphere, a permittivity of 2,000 or more, and capable of satisfying a temperature characteristic of X7R characteristic or X8R characteristic.

The invention provides, in a first embodiment, a multi-layer ceramic capacitor comprising substantially or nearly hexahedron multi-layer ceramics, internal electrodes formed in the multi-layer ceramics such that they can oppose to each other by way of dielectric ceramics and can be led alternately to different end faces, end termination electrodes formed on both end faces of the multi-layer ceramics and connected electrically to the internal electrodes led to the end faces respectively, in which the internal electrode comprises Cu or a Cu alloy, the dielectric ceramics are sintered body of a perovskite type dielectric substance mainly comprising $BaTiO_3$ (BT) constituted with grains having an average value for the diameter of 400 nm or less as viewed on a cross section and grain boundaries, and the grain comprises a dielectric substance having a domain pattern and a shell formed on the surface of the dielectric substance. The cross section need not be a cross section in a thickness direction but may mean a cross section which shows when polishing the multi-layer ceramic capacitor in a polishing direction. In an embodiment, each grain possesses a grain boundary around the shell. The domain pattern is formed uniquely in a $BaTiO_3$-based ceramic. The domain pattern may or may not be observed depending on the angle of observation. Typically, the domain pattern is a stripe pattern. The grain size can be controlled by selecting a $BaTiO_3$ (BT) material having a proper diameter (smaller than 400 nm).

According to the above first embodiment of the invention, a multi-layer ceramic capacitor capable of satisfying the temperature characteristic of X7R characteristic or X8R characteristic can be obtained. Further, since dielectric ceramics with the permittivity of 2,000 or higher can be obtained by baking under a reducing atmosphere at a relative low temperature of 1,080° C. or lower, a multi-layer ceramic capacitor small in the size and large in the capacitance can be obtained.

Further, the invention provides, in a second embodiment, a multi-layer ceramic capacitor in which t/D is from 2% to 10% where D represents an average value for the diameter of the grains as viewed on the cross section and t represents an average value for the thickness of the shell. The t/D can be controlled by manipulating a baking temperature for forming the sintered body and/or a stirring time of the ingredients. According to the embodiment, a multi-layer ceramic capacitor capable of satisfying the temperature characteristic of X7R characteristic and X8R characteristic and having a life time property not suffering from deterioration for 24 hours or more under a circumstance of 150° C.-20 V/μm.

Further, the invention provides, in a third embodiment, a multi-layer ceramic capacitor in which Cu is distributed in the dielectric ceramics put between the internal electrodes. According to the third aspect, since Cu is distributed in the dielectric ceramics, a potential barrier of the shell and the grain boundary is increased, even dielectric ceramics sintered in a reducing atmosphere at a relatively low temperature of 1,080° C. or lower can provide a sufficient insulating property to improve the high temperature acceleration life time property.

In an embodiment, the invention can provide a multi-layer ceramic capacitor that can be sintered at 1,080° C. or lower in a reducing atmosphere, has a permittivity of 2,000 or more and can satisfy the temperature characteristic of X7R characteristic or X8R characteristic.

For purposes of summarizing the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

DESCRIPTION OF THE ACCOMPANYING DRAWINGS

These and other features of this invention will now be described with reference to the drawings of preferred embodiments which are intended to illustrate and not to limit the invention. The drawings are oversimplified for illustrative purposes and are not to scale.

PREFERRED EMBODIMENTS OF THE INVENTION

Figure 1:
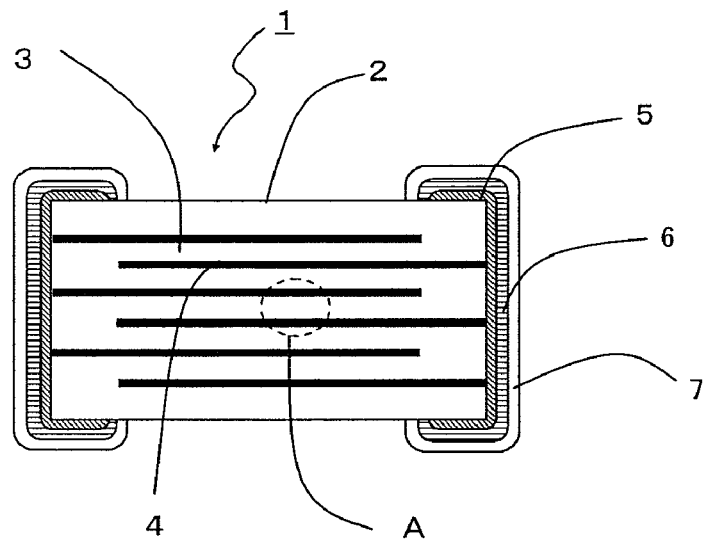
FIG. 1 is a schematic cross sectional view showing a multi-layer ceramic capacitor according to an embodiment of the invention (in an embodiment, the number of layers may be 100 to 1,000)

A multi-layer ceramic capacitor according to an embodiment of the invention is to be described by way of preferred embodiments. As shown in FIG. 1, a multi-layer ceramic capacitor 1 according to the embodiment has a multi-layer ceramic 2 constituted with layered dielectric ceramics 3 and internal electrodes 4 formed being opposed to each other by way of the dielectric ceramics. End termination electrodes 5 are formed on both end faces of the multi-layer ceramic 2 so as to be connected electrically with the internal electrodes, and a first plating layer 6 and a second plating layer 7 are formed optionally thereon.

Figure 2:
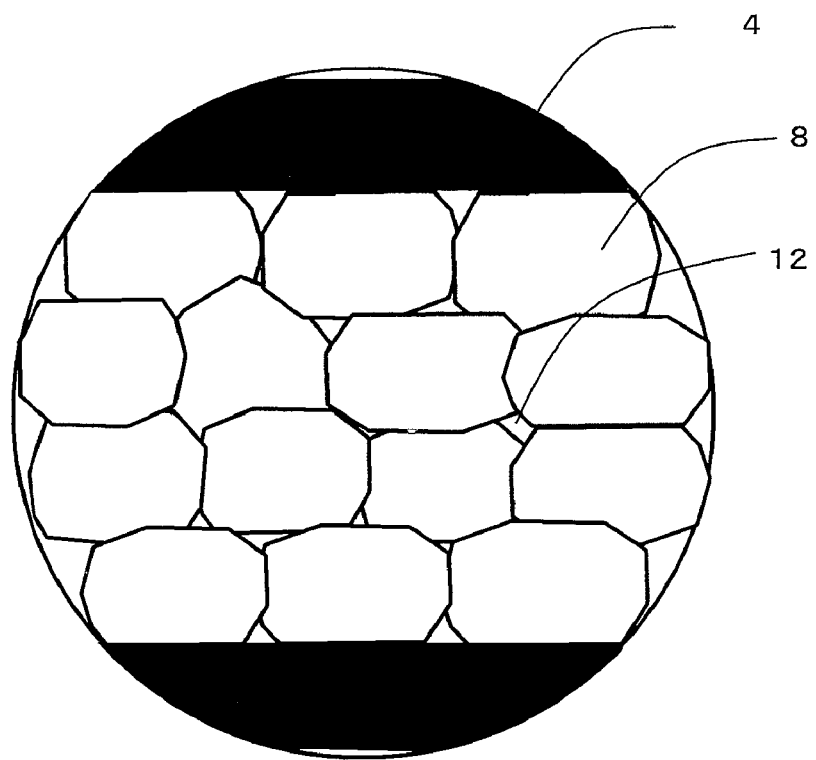
FIG. 2 is an enlarged view for a portion A in FIG. 1.
Figure 3:
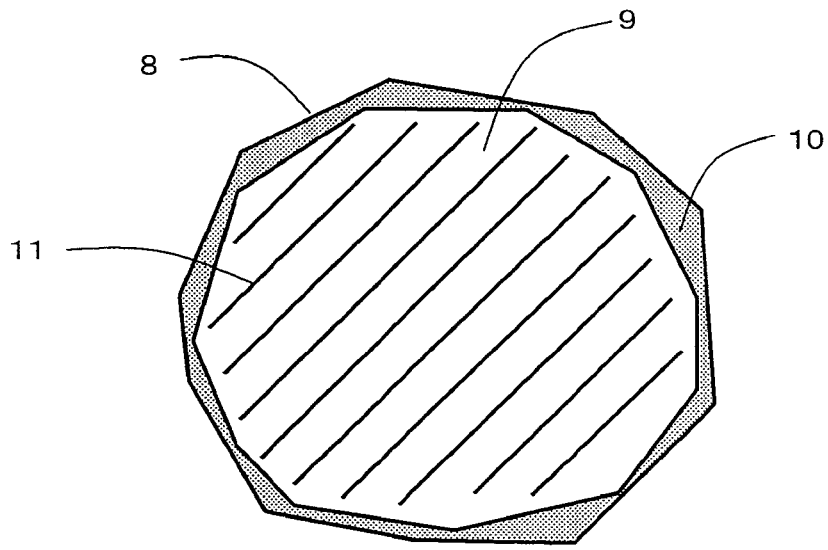
FIG. 3 is a schematic view showing a fine structure of grains according to an embodiment of the present invention.

The dielectric ceramics 3 includes grains 8 and grain boundaries 12 as shown in FIG. 2. The grain 8 comprises a dielectric substance 9 and a shell 10 formed on the surface of the dielectric substance 9 as shown in FIG. 3, and the dielectric substance 9 has a stripe-shaped domain pattern 11. The domain pattern is a pattern recognized under observation of TEM (Transmission Electron Microscope) for the cross section of the dielectric ceramics, which appears by spontaneous polarization of crystal grains. Since the optical characteristics are different between the dielectric substance 9 and the shell 10, the boundary is observed relatively distinctly.

The shell 10 is formed when additives, for example, rare earth compounds and Mn compounds and a portion of the dielectric substance 9 are melted into a sintering aid in a liquid phase to form a solid solution and precipitated again on the surface of the dielectric substance 9 in the course of the baking process. The shell 10 has an insulation resistance higher than that of the dielectric substance 9 and the life time property is improved as the thickness of the shell increases. The rare earth compounds include at least one oxide of metals selected from La, Ce, Pr, Nd, Sm, Eu, Gd, Tb, Dy, Ho, Er, Tm, Yb, Lu and Y. Further, the Mn compounds include oxides such as MnO, $MnCO_3$, and $Mn_3O_4$. Further, the grain boundary 12 is present between the grains in which the sintering aid or additives formed as a liquid phase are present.

On the other hand, the temperature characteristic is determined depending on the size of the grains and the balance between the dielectric substance and the shell. For obtaining a multi-layer ceramic capacitor having X7R characteristic or X8R characteristic, dielectric ceramics with the average value for the diameter of the grains of 400 nm or less are used. In a case where the average value for the diameter of the grains is 400 nm or less, since the permittivity of the grain per se is lowered compared with that of more than 400 nm, the temperature change of the permittivity is decreased to obtain a flat temperature characteristic for a wider temperature range. Further, for compatibilizing favorable life time property and the temperature characteristic such as X7R characteristic or X8R characteristic, dielectric ceramics with t/D of from 2% to 10% where D represents the average value for the diameter of the grains and t is the average value for the thickness of the shells are used. The X7R characteristic means the rate of change of the permittivity of ±15% within a temperature range of from −55° C. to 125° C. with the permittivity at 25° C. being as a reference. Further, the X8R characteristic means the rate of change of the permittivity of ±15% within a temperature range of from −55° C. to 150° C. with the permittivity at 25° C. being as a reference.

Figure 4:
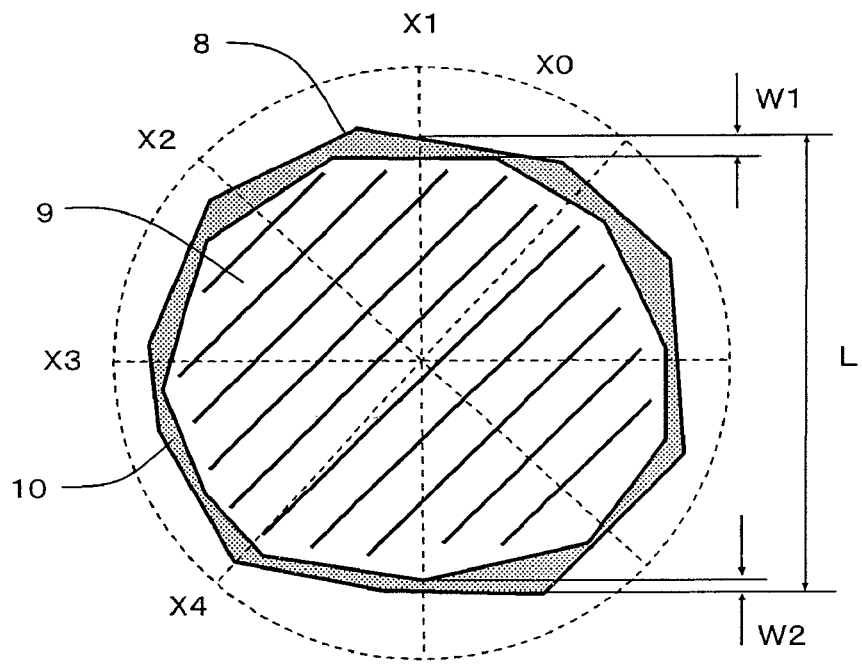
FIG. 4 is a view showing a method of measuring an average value for the diameter of grains and an average value for the thickness of the shells according to an embodiment of the present invention.

A method of calculating the average value D for the diameter of the grains and the average value t for the thickness of the shells is to be described with reference to FIG. 4. First, the cross section of the dielectric ceramic layer is observed by TEM under magnification and measurement is conducted for one grain 8 as described below. A circle XO is drawn so as to surround the grain 8 and then four lines X1, X2, X3, and X4 are drawn so as to equally divide the circle XO into eight portions (the angle formed at the center by two adjacent lines is 45°). Line X1 is drawn in a thickness direction, and line X3 is drawn in a direction perpendicular to the thickness direction. Then, for line X1, a length L across the grain 8 is measured. Then, the width W1 and the width W2 from the boundary between the dielectric substance 9 and the shell 10 to the grain boundary is measured to calculate: (W1+W2)/2=W. Calculation for L and W is also conducted for lines X2, X3, and X4 to calculate the average values for L and W on one grain. Then, this is conducted for the grains by the number of 100 and the average value D for the diameter of the grains is determined based on the average value of L and t is determined based on the average value of W.

Further, in a case of constituting the dielectric ceramic 3 with a sintered body of a perovskite type dielectric material mainly comprising $BaTiO_3$, dielectric ceramics with the permittivity of 2,000 or more are obtained. The perovskite type dielectric substance mainly comprising $BaTiO_3$ includes $BaTiO_3$, as well as those substituting a portion of Ba for Ca or Sr, and those substituting a portion of Ti for Zr or Hf.

The perovskite type dielectric substance mainly comprising $BaTiO_3$ is often baked usually at a temperature of 1,100° C. or higher and when it is densified in a reducing atmosphere at 1,080° C. or lower or 1,000° C. or lower using a sintering aid or the like, the insulation resistance is lowered to deteriorate the life time property. However, in a case of forming the internal electrodes 4 with Cu or a Cu alloy, a portion of Cu of the internal electrodes 4 diffuses into the dielectric ceramics 3, particularly, the dielectrics 3 put between the internal electrodes 4. The potential barrier of the shell 10 and the grain boundary 12 is increased by diffused and distributed Cu to obtain a sufficient insulating property, and the high temperature acceleration life time property is improved. The Cu alloy includes Cu—Ni alloys, Cu—Ag alloys, etc.

The internal electrodes 4 are formed by printing a conductive paste to a ceramic green sheet by a method of screen printing or the like. Further, a portion of Cu can be diffused from the internal electrodes 4 into the dielectric ceramics 3 by applying a heat treatment at a temperature of about 700° C. in a nitrogen atmosphere or the like after sintering (including temperature lowering stage in the baking step).

End termination electrodes 5 comprise Cu, Ni, Ag, Cu—Ni alloy, or Cu—Ag alloy and are formed by coating and baking a conductive paste to the multi-layer ceramics 2 after baking, or by coating a conductive paste to a not baked multi-layer ceramics 2 and baking simultaneously with the baking of the multi-layer ceramics 2. On the end termination electrodes 5, plating layers 6, 7 are formed by electrolytic plating or the like. The first plating layer 6 has a role of protecting the end termination electrodes 5 and comprises, for example, with Ni or Cu. The second plating layer 7 has a role of improving the solder wettability and comprises Sn or Sn alloys.

In the present disclosure where conditions and/or structures are not specified, the skilled artisan in the art can readily provide such conditions and/or structures, in view of the present disclosure, as a matter of routine experimentation.

The effect of the invention in embodiments is to be described based on specific examples. First, as shown in Table 1, raw materials M1 to M14 were provided.

TABLE 1

| Dielectric material | Main ingredient | BT grain size (μm) | Additives (mol) | | Sintering aid (mol) | | |
|---|---|---|---|---|---|---|---|
| | | | MnO | Rare Earth | $B_2O_3$ | $Li_2O$ | $SiO_2$ |
| M1 | $BaTiO_3$ | 0.28 | 0.5 | None | 0.2 | 0.9 | 0.9 |
| M2 | $BaTiO_3$ | 0.28 | None | $Dy_2O_3$: 0.25 | 0.2 | 0.9 | 0.9 |
| M3 | $BaTiO_3$ | 0.28 | 0.5 | $Dy_2O_3$: 0.25 | 0.2 | 0.9 | 0.9 |
| M4 | $BaTiO_3$ | 0.33 | 0.5 | $Dy_2O_3$: 0.25 | 0.2 | 0.9 | 0.9 |
| M5 | $BaTiO_3$ | 0.40 | 0.5 | $Dy_2O_3$: 0.25 | 0.2 | 0.9 | 0.9 |
| M6 | $BaTiO_3$ | 0.45 | 0.5 | $Dy_2O_3$: 0.25 | 0.2 | 0.9 | 0.9 |
| M7 | $BaTiO_3$ | 0.28 | 0.5 | $Gd_2O_3$: 0.25 | 0.2 | 0.9 | 0.9 |
| M8 | $BaTiO_3$ | 0.28 | 0.5 | $Ho_2O_3$: 0.25 | 0.2 | 0.9 | 0.9 |
| M9 | $BaTiO_3$ | 0.28 | 0.5 | $Er_2O_3$: 0.25 | 0.2 | 0.9 | 0.9 |
| M10 | $BaTiO_3$ | 0.28 | 0.5 | $Yb_2O_3$: 0.25 | 0.2 | 0.9 | 0.9 |
| M11 | $BaTiO_3$ | 0.28 | 0.5 | $Y_2O_3$: 0.25 | 0.2 | 0.9 | 0.9 |
| M12 | $Ba(Ti_{0.9}Zr_{0.1})O_3$ | 0.28 | 0.5 | $Dy_2O_3$: 0.25 | 0.2 | 0.9 | 0.9 |
| M13 | $(Ba_{0.9}Sr_{0.1})TiO_3$ | 0.28 | 0.5 | $Dy_2O_3$: 0.25 | 0.2 | 0.9 | 0.9 |
| M14 | $(Ba_{0.9}Ca_{0.1})TiO_3$ | 0.28 | 0.5 | $Dy_2O_3$: 0.25 | 0.2 | 0.9 | 0.9 |

The addition amounts of the additives and the sintering aid are described by the number of moles based on 100 mol of the main ingredient. Further, for the size of BT grains, the starting powder for the main ingredient was observed by SEM (scanning electron microscope) under magnification, the grain size was measured for the grains by the number of 300, and the grain size was defined as the average value for them.

In the present examples, the numerical numbers applied in embodiments can be modified by a range of at least ±50% in other embodiments, and the ranges applied in embodiments may include or exclude the endpoints.

Example 1

A starting material M3 in table 1 was provided, which was wet-mixed for 15 hours in a ball mill, calcined at 400° C. for 2 hours in an atmospheric air after drying and dry-pulverized to obtain a dielectric material powder. Then, polyvinyl butylal, an organic solvent, and a plasticizer were admixed to the powder to form a ceramic slurry. The ceramic slurry was sheeted by a roll coater to obtain a ceramic green sheet of 5 μm thickness. A Cu internal electrode paste (specimen 1-1) or an Ni internal electrode paste (specimen 1-2) was coated on the ceramic green sheet by screen printing to form an internal electrode pattern. Ceramic green sheets on which the internal electrode pattern was formed were stacked by the number of 20 sheets, press bonded, and then cut and divided each into a size of 4.0×2.0 mm to form green chips. The green chip was removed with the binder in a nitrogen atmosphere and, successively, baked at a baking temperature shown in Table 2 in a reducing atmosphere. The baking pattern was set such that the temperature shown in Table is kept for 2 hours, then the temperature was lowered to about 700° C. and kept for 2 hours while changing atmosphere with a nitrogen atmosphere, and then lowered to a room temperature. After baking, a Cu end termination electrode paste was coated on the exposed surface of the internal electrodes and baked in an inert gas.

For the thus obtained multi-layer ceramic capacitors sized 3.2×1.6 mm and having a thickness of the dielectric ceramics between the internal electrodes of 4 μm, the average value for the grain size, t/D, permittivity, temperature characteristic and high temperature acceleration life time were measured and collectively shown in Table 2. The permittivity was determined by measuring static capacitance at 25° C. by an LCR meter, and conducting calculation based on the crossing area of the multi-layer ceramic capacitor as a specimen, and the thickness and the number of layers of the dielectric ceramics. Further, the temperature characteristic was evaluated as satisfactory for those having the change of the static capacitance within a range of ±15% from −55° C. to 125° C. (X7R) or from −55° C. to 150° C. (X8R) with the static capacitance at 25° C. being as a reference. Further, the high temperature life time was estimated as "o" when measurement was conducted for each of the specimens by the number of 15 under a load at 150° C. for 20 V/μm and in a case where the time at which the insulating resistance value lowered to 1 MΩ or less was 24 hours or more.

TABLE 2

| Specimen No. | Dielectric material | Stirring time (hr) | Internal Electrode | Baking temperature (° C.) | Grain size (μm) | t/D | Dielectric characteristic | | Life time characteristic |
|---|---|---|---|---|---|---|---|---|---|
| | | | | | | | Permittivity | Temperature characteristic | |
| 1-1 | M3 | 15 | Cu | 1000 | 0.28 | 5% | 2010 | X8R | ◯ |
| 1-2 | M3 | 15 | Ni | 1000 | 0.28 | 5% | 2100 | X7R | X |

From the results described above, the specimen using the internal electrodes formed of Cu could provide a multi-layer ceramic capacitor having a permittivity of 2,000 or more, and a temperature characteristic capable of satisfying X7R characteristic or X8R characteristic and having a favorable high temperature acceleration life time property. On the other hand, in another specimen having internal electrodes formed of Ni, the high temperature acceleration life time property could not satisfy a desired level by the baking at 1,000° C.

Example 2

A starting material M4 in Table 1 was provided and multi-layer ceramic capacitors were formed in the same manner as in Example 1 except for using the conditions of the stirring time for the wet mixing and the baking temperature shown in Table 3. The average value for the grain size, t/D, the permittivity, the temperature characteristic, and the high temperature acceleration life time were measured and collectively shown in Table 3.

property was lowered. In a case where it was more than 10%, the temperature characteristic did not satisfy the X7R characteristic or X8R characteristic. As can be seen from Table 3, t/D can be controlled by controlling the baking temperature and the stirring time.

Example 3

Starting materials M1 and M2 in Table 1 were provided, multi-layer ceramic capacitors were formed in the same manner as in Example 1, and the average value for the grain size, t/D, the permittivity, the temperature characteristic, and the high temperature acceleration life time were measured and collectively shown in Table 4. In this case, the effect of the additives was verified.

TABLE 3

| Specimen No. | Dielectric material | Stirring time (hr) | Internal Electrode | Baking temperature (° C.) | Grain size (μm) | t/D | Permittivity | Dielectric characteristic Temperature characteristic | Life time characteristic |
|---|---|---|---|---|---|---|---|---|---|
| 2-1 | M4 | 15 | Cu | 1000 | 0.33 | 4% | 2520 | X8R | ◯ |
| 2-2 | M4 | 20 | Cu | 1000 | 0.33 | 5% | 2540 | X8R | ◯ |
| 2-3 | M4 | 25 | Cu | 1000 | 0.35 | 7% | 2680 | X7R | ◯ |
| 2-4 | M4 | 30 | Cu | 1000 | 0.35 | 10% | 2700 | X7R | ◯ |
| 2-5 | M4 | 40 | Cu | 1000 | 0.35 | 15% | 2750 | NG | ◯ |
| 2-6 | M4 | 15 | Cu | 980 | 0.33 | 2% | 2480 | X8R | ◯ |
| 2-7 | M4 | 15 | Cu | 960 | 0.33 | 1% | 2420 | X8R | X |

From the results described above, those specimens using the internal electrodes formed of Cu, having the average value for the diameter of the grains of 400 nm or less and with t/D of from 2 to 10% could provide multi-layer ceramic capacitors having the permittivity of 2,000 or more, and the temperature characteristic capable of satisfying X7R characteristic or X8R characteristic, and having a favorable high temperature acceleration life time property. On the other hand, in a case where t/D was less than 2%, the life time

TABLE 4

| Specimen No. | Dielectric material | Stirring time (hr) | Internal Electrode | Baking temperature (° C.) | Grain size (μm) | t/D | Permittivity | Dielectric characteristic Temperature characteristic | Life time characteristic |
|---|---|---|---|---|---|---|---|---|---|
| 3-1 | M1 | 15 | Cu | 1000 | 0.30 | 4% | 2050 | X8R | X |
| 3-2 | M2 | 15 | Cu | 1000 | 0.36 | 7% | 2810 | X7R | X |

From the results described above, it was found that the life time property was lowered in a case where only one of the Mn oxides and the rare earth oxides was contained as the additives.

Example 4

Starting materials M5 and M6 in Table 1 were provided, multi-layer ceramic capacitors were formed in the same manner as in Example 1, and the average value for the grain size, t/D, the permittivity, the temperature characteristic, and the high temperature acceleration life time were measured and collectively shown in Table 5.

TABLE 5

| Specimen No. | Dielectric material | Stirring time (hr) | Internal Electrode | Baking temperature (° C.) | Grain size (μm) | t/D | Permittivity | Temperature characteristic | Life time characteristic |
|---|---|---|---|---|---|---|---|---|---|
| 4-1 | M5 | 15 | Cu | 1000 | 0.40 | 5% | 3010 | X7R | ◯ |
| 4-2 | M6 | 15 | Cu | 1000 | 0.45 | 4% | 3530 | NG | ◯ |

From the results described above, the specimen having the internal electrodes of Cu and having the average value for the diameter of the grains of 0.40 μm, that is, 400 nm could provide a multi-layer ceramic capacitor satisfying the temperature characteristic of the X7R characteristic. On the other hand, another having the average value for the diameter of the grains of 0.45 μm did not satisfy the temperature characteristic of the X7R characteristic or the X8R characteristic.

Example 5

Starting materials M7 to M14 in Table 1 were provided, multi-layer ceramic capacitors were formed in the same manner as in Example 1, and the average value for the diameter of the grains, t/D, the permittivity, the temperature characteristic, and the high temperature acceleration life time were measured and collectively shown in Table 6. Verification was conducted to a case of changing the kind of the rare earth and a case of changing the perovskite dielectric substance as the main ingredient.

TABLE 6

| Specimen No. | Dielectric material | Stirring time (hr) | Internal Electrode | Baking temperature (° C.) | Grain size (μm) | t/D | Permittivity | Temperature characteristic | Life time characteristic |
|---|---|---|---|---|---|---|---|---|---|
| 5-1 | M7 | 15 | Cu | 1000 | 0.28 | 4% | 2020 | X8R | ◯ |
| 5-2 | M8 | 15 | Cu | 1000 | 0.28 | 6% | 2010 | X8R | ◯ |
| 5-3 | M9 | 15 | Cu | 1000 | 0.28 | 5% | 2060 | X8R | ◯ |
| 5-4 | M10 | 15 | Cu | 1000 | 0.28 | 4% | 2040 | X8R | ◯ |
| 5-5 | M11 | 15 | Cu | 1000 | 0.28 | 5% | 2040 | X8R | ◯ |
| 5-6 | M12 | 15 | Cu | 1000 | 0.28 | 5% | 2420 | X7R | ◯ |
| 5-7 | M13 | 15 | Cu | 1000 | 0.28 | 6% | 2130 | X7R | ◯ |
| 5-8 | M14 | 15 | Cu | 1000 | 0.28 | 6% | 2220 | X7R | ◯ |

From the results described above, even in a case of changing the kind of the rare earth with those other than Dy or changing the perovskite dielectric substance as the main ingredient, those specimens having the internal electrodes formed of Cu and having the average value for the diameter of the grains of 400 nm, and with t/D of from 2% to 10% could provide multi-layer ceramic capacitors satisfying the temperature characteristic of the X7R characteristic or X8R characteristic and having favorable high temperature acceleration life time property.

From the results described above, the multi-layer ceramic capacitors, so long as they are within specific ranges, can provide multi-layer ceramic capacitors that can be sintered at 1,080° C. or lower in a reducing atmosphere, have a permittivity of 2,000 or more, and satisfy the temperature characteristic of the X7R characteristic or the X8R characteristic.

The present application claims priority to Japanese Patent Application No. 2006-281923, filed Sep. 15, 2006, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A multi-layer ceramic capacitor having substantially hexahedron multi-layer ceramics, internal electrodes formed in the multi-layer ceramics such that they are opposed to each other by way of the dielectric ceramics and led out alternately to different end faces, and end termination electrodes formed on both end faces of the multi-layer ceramics and connected electrically to the internal electrodes led out to the end faces respectively, in which the internal electrode is formed of Cu or a Cu alloy, the dielectric ceramics are a sintered body of a perovskite dielectric substance material mainly comprising $BaTiO_3$ constituted with grains with an average value for the diameter of 400 nm or less as viewed on the cross section and a grain boundary, and the grain is constituted with a dielectric substance having a domain pattern and a shell formed on the surface of the dielectric substance, wherein Cu is distributed in the dielectric ceramics put between the internal electrodes, wherein t/D is from 200 to 10% where D represents an average value for the diameter of the grains as viewed on the cross section and t represents the average value for the thickness of the shells.

2. A multi-layer ceramic capacitor comprising:

substantially or nearly hexahedron multi-layer ceramics comprised of a plurality of dielectric ceramic layers stacked in a thickness direction and having two end surfaces opposite to each other formed by ends of the plurality of dielectric ceramic layers;

internal electrodes each formed between the respective dielectric ceramic layers stacked next to each other, said internal electrodes extending alternately from the respective two end surfaces; and end termination electrodes formed on both of the two end surfaces and electrically connected to each of the internal electrodes extending therefrom, wherein each internal electrode is constituted of Cu or a Cu alloy, each dielectric ceramic layer is a sintered body of a perovskite dielectric substance material mainly comprising $BaTiO_3$ constituted by grains having an average diameter of 400 nm or less as viewed cross-sectionally and grain boundaries, and the grain is constituted by a dielectric substance having a domain pattern and a shell formed on the surface of the dielectric substance, wherein Cu exists diffused and distributed in the dielectric ceramic layers from the internal electrodes contacting the dielectric ceramic layers, wherein t/D is from 2% to 10% where D represents an average diameter of the grains as viewed on a cross section and t represents an average thickness of the shells.

3. The multi-layer ceramic capacitor according to claim 2, which has a permittivity of 2000 or more and satisfies the X7R or X8R characteristics.

4. The multi-layer ceramic capacitor according to claim 2, wherein each dielectric ceramic layer has a thickness of 1 μm to 10 μm.

5. The multi-layer ceramic capacitor according to claim 2, wherein each dielectric ceramic layer further comprises a rare earth compound and a Mn oxide compound.

6. The multi-layer ceramic capacitor according to claim 5, wherein the rare earth compound includes at least one oxide of metals selected from the group consisting of La, Ce, Pr, Nd, Sm, Eu, Gd, Tb, Dy, Ho, Er, Tm, Yb, Lu and Y.

7. The multi-layer ceramic capacitor according to claim 2, wherein the shell is a precipitate when forming the sintered body.

* * * * *